United States Patent
Okamoto et al.

(10) Patent No.: US 7,287,896 B2
(45) Date of Patent: Oct. 30, 2007

(54) ASSEMBLY FOR AN ILLUMINATION DEVICE

(75) Inventors: Hidefumi Okamoto, Tokyo (JP); Toshiyuki Kondo, Tokyo (JP); Shinichi Ito, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 23 days.

(21) Appl. No.: 11/108,872

(22) Filed: Apr. 19, 2005

(65) Prior Publication Data
US 2005/0270794 A1 Dec. 8, 2005

(30) Foreign Application Priority Data
Apr. 28, 2004 (JP) ............... 2004-133828

(51) Int. Cl.
*F21V 7/04* (2006.01)
(52) U.S. Cl. ............ 362/634; 362/633; 362/612; 362/800; 362/248
(58) Field of Classification Search ............ 362/231, 362/612, 634, 602, 555, 475, 523, 197, 800
See application file for complete search history.

(56) References Cited

U.S. PATENT DOCUMENTS

| | | | | |
|---|---|---|---|---|
| 4,533,984 A | * | 8/1985 | Gatton | 362/232 |
| 4,936,668 A | * | 6/1990 | Mori | 385/31 |
| 6,509,840 B2 | * | 1/2003 | Martineau | 340/815.45 |
| 6,787,999 B2 | * | 9/2004 | Stimac et al. | 315/51 |
| 6,857,756 B2 | * | 2/2005 | Reiff et al. | 362/184 |
| 6,884,906 B2 | * | 4/2005 | Dewis et al. | 560/188 |
| 7,033,084 B2 | * | 4/2006 | Lappohn | 385/73 |
| 7,048,414 B2 | * | 5/2006 | Weber | 362/267 |
| 7,088,403 B2 | * | 8/2006 | Kim | 349/58 |
| 7,159,997 B2 | * | 1/2007 | Reo et al. | 362/240 |
| 2004/0136177 A1 | * | 7/2004 | Lewis et al. | 362/101 |
| 2004/0252480 A1 | * | 12/2004 | Mai et al. | 362/31 |
| 2006/0012991 A1 | * | 1/2006 | Weaver et al. | 362/235 |

FOREIGN PATENT DOCUMENTS

| | | |
|---|---|---|
| JP | 07-134902 | 5/1995 |
| JP | 10199315 | 7/1998 |
| JP | 10334718 | 12/1998 |
| JP | 2003162912 | 6/2003 |
| JP | 2004-045192 | 2/2004 |
| JP | 2004045192 | 2/2004 |

* cited by examiner

*Primary Examiner*—Sandra O'Shea
*Assistant Examiner*—Kristen A Manskar
(74) *Attorney, Agent, or Firm*—Cermak Kenealy & Vaidya LLP

(57) ABSTRACT

A light access can be integrally formed with a light guide on at least one end of the light guide. A printed circuit board with an LED lamp mounted thereon can be press-fitted in the light access for transient arrangement, and can be fixed by a cover. The position of the printed circuit board can be determined in relation to the light guide. For example, engagement hooks of the light access can be fitted with recesses in the printed circuit board for positioning the circuit board in a plane normal to the longitudinal direction of the light guide. Similarly, positioning ribs of the light guide can be employed for positioning in the longitudinal direction of the light guide. The light guide can be formed in an almost rod shape having four sides in section normal to the longitudinal direction of the light guide. A light guide lens can be formed in one surface and a diffuser cut can be formed in the opposite surface of the light guide.

21 Claims, 5 Drawing Sheets

ASSEMBLY FOR AN ILLUMINATION DEVICE

This application claims the priority benefit under 35 U.S.C. §119 of Japanese Patent Application No. 2004-133828 filed on Apr. 28, 2004, which is hereby incorporated by reference.

BACKGROUND OF THE INVENTION

1. Field of the Invention

The invention relates to an illumination device or unit for use in vehicular lamps, game machines, decorative illuminations, etc. More particularly, it relates to an illumination device or unit of the type that introduces light into a light guide having a free shape, such as a linear shape, a curved shape, an annular shape, etc., through at least one end of the light guide.

2. Description of the Related Art

FIG. 6 is an example of the related art showing a method of coupling a light guide 101 to a light source (light emitting diode 102) that emits light that is led to the light guide 101. The light guide 101 is inserted through an open end provided at a guide portion 104 of a body 103 and fixed by a screw 105. A collimator lens 107 and a condenser lens 108 are attached to a support member 109, which is inserted into a cylinder 106 of the body 103 and fixed by a fastening screw 110.

The light emitting diode 102 serving as the light source is mounted on an aluminum-based printed circuit board 111, which is attached to a base 112 by a resinous screw 113. An electric wire 114 for supplying power to the light emitting diode 102 is inserted through the outer bottom of the base 112 and connected by soldering to a mounting surface of the aluminum-based printed circuit board 111.

The base 112 (to which the aluminum-based printed circuit board 111 with the light emitting diode 102 mounted thereon is attached), the support member 109 (to which the collimator lens 107 and the condenser lens 108 are attached), and the body 103 (to which the light guide 101 is attached), can be coupled together by engaging a male threaded portion 115, which is formed on the outer rim around an open end of the base 112, with a female threaded portion 116, which is formed on the inner wall around an open end of the cylinder 106 of the body 103.

In the illumination device 200 thus configured, the light emitted from the light emitting diode 102 is converted at the collimator lens 107 into an almost collimated light, which advances to the condenser lens 108. The collimated light is condensed at the condenser lens 108 having a focus in the vicinity of an incident end surface 117 of the light guide 101. The condensed light is introduced through the incident end surface 117 of the light guide 101 into the light guide 101 and guided inside the light guide 101 to an exit end surface 118. It is finally externally radiated (to the atmosphere) from the exit end surface 118 (see, for example, Japanese Patent Application Publication No. JP-A 2004-45192).

The above-described conventional illumination device is assembled with screw fixtures at three locations and a thread engagement at one location. The screw fixtures at three locations include the following. The aluminum-based printed circuit board with the light emitting diode mounted thereon is fixed to the base at a first location. The support member with the collimator lens and the condenser lens attached thereto is fixed to the cylinder of the body at another location. The light guide is fixed to the open end provided at the guide portion of the body at a yet another location.

The thread engagement is also found in the coupling among the base (to which the aluminum-based printed circuit board with the light emitting diode mounted thereon is attached), the support member (to which the collimator lens and the condenser lens are attached), and the body (to which the light guide is attached).

Accordingly, on assembling the illumination device thus configured, an increase in the number of assembly steps associated with the steps for screw fixtures at three locations and the step for thread engagement at one location results in a reduction in yield and accordingly boosts production costs.

Further, no structure or device is provided for positioning the incident end surface of the light guide. Accordingly, when the light guide is inserted and fixed in the open end provided at the guide portion of the body, the incident end surface of the light guide varies in position on a product by product basis. As a result, the illumination pattern emitted from the light guide varies among products.

The invention has been devised in consideration of the above and other problems. In accordance with an aspect of the invention, an illumination device can be capable of achieving easy operation and maintenance for coupling between a light source and a light guide. The illumination device can also be capable of precisely reproducing a positional relation between the light source and a light incident surface of the light guide, and achieving less variation in illumination pattern among products.

SUMMARY OF THE INVENTION

In accordance with an aspect of the invention, an illumination unit or device can include an optical guide section and a light source section. The optical guide section can include a light guide composed of a transparent material, and a light access having a pair of engagement hooks and a pair of ribs extending in the direction opposite to the direction of extension of the light guide and integrally formed on at least one end of the light guide with the light guide. The light source section can also include a printed circuit board having a pair of opposite ends with respective recesses formed therein, and at least one light source mounted on the printed circuit board. The engagement hooks of the light access can be respectively fitted with the recesses in the printed circuit board to position the printed circuit board in a plane normal to the longitudinal direction of the light guide. Tips of the pair of the ribs of the light access can be formed to impinge against the printed circuit board to position the printed circuit board in the longitudinal direction of the light guide. The tips of the pair of the ribs of the light access and engagement surfaces of the pair of the engagement hooks of the light access can sandwich the printed circuit board (with the light source mounted thereon) therebetween.

In another aspect of the invention, the illumination unit or device can include a cover composed of an opaque material and having angles formed thereon. The angles and the tips of the pair of ribs of the light access can be formed to sandwich the printed circuit board with the light source mounted thereon. The cover and the engagement hooks of the light access can cover the printed circuit board to prevent leakage of light.

In another aspect of the invention, the light guide can be formed in an almost rod shape. The light guide can include four sides in section normal to the longitudinal direction of the light guide, one surface with a light guide lens formed almost semicylindrical therein, and the other opposite surface with a diffuser cut formed to have almost serrate edges or a substantially triangular-wavy surface therein.

In another aspect of the invention, the light source mounted on the printed circuit board can include an LED lamp containing one or more LED chips having the same emission color or an LED lamp containing a plurality of LED chips having different emission colors.

In another aspect of the invention, the LED lamp containing a plurality of LED chips having different emission colors can be configured to emit any monochromatic light, lights of any selected colors, or lights of all colors.

In accordance with another aspect of the invention, the light access can be formed integrally with the light guide on at least one end of the light guide. The light source section with the light source mounted thereon can be press-fitted in the light access to perform positioning and transient arrangement at the same time. Therefore, on assembling the illumination device, members such as screws and adhesives may not be required. This is effective to reduce the cost of materials. In addition, time-consuming work such as thread engagement is not required. Accordingly, production costs can be reduced by simplified assembly and improved production efficiency. Even if replacement of the light source is required due to an alteration in the illumination color or reduction in emission efficiency, the cost of maintenance can be minimized because there are a small number of components for replacement, and because replacement work can be simplified.

The light access for use in fixation of the light source section thereto can be integrally formed with the light guide. Therefore, the light source and the light access can be positioned in three-dimensions (in X-, Y- and Z-directions) with excellent accuracy when the light source section is fixed to the light access. As a result, an illumination device having less variation in illumination pattern from product to product can be produced with excellent reproducibility and high yields.

The light access and the cover can be employed to enclose the light source section to block light other than the light emitted from the light source toward the light guide of the light access to prevent external leakage of light. As a result, the illumination device can be configured to externally radiate only the light from the light guide and can be capable of effectively exhibitting an optical producing effect.

In accordance with another aspect of the invention, an illumination device can include a light guide having a longitudinal axis and a light access integrally formed with an end of the light guide and including an engagement/spacer portion formed therein. A cover can be connected to the engagement/spacer portion. A light source can be located between the light access and cover and spaced from the light guide by a spacer structure.

Further, the LED lamp can be simply provided to one optical guide section only at an end to configure the illumination device. Accordingly, it is possible to achieve a reduced consumption power, an increased life of the light source, and a lowered cost. In addition, an LED lamp containing a plurality of LED chips having different emission colors can be employed for multicolor applications, switching between light colors, and mixture of colors, which effects improvements in illumination and display functions.

BRIEF DESCRIPTION OF THE DRAWINGS

These and other features and advantages of the invention will become clear from the following description with reference to the accompanying drawings, wherein.

DETAILED DESCRIPTION OF PREFERRED EMBODIMENTS

Figure 1:
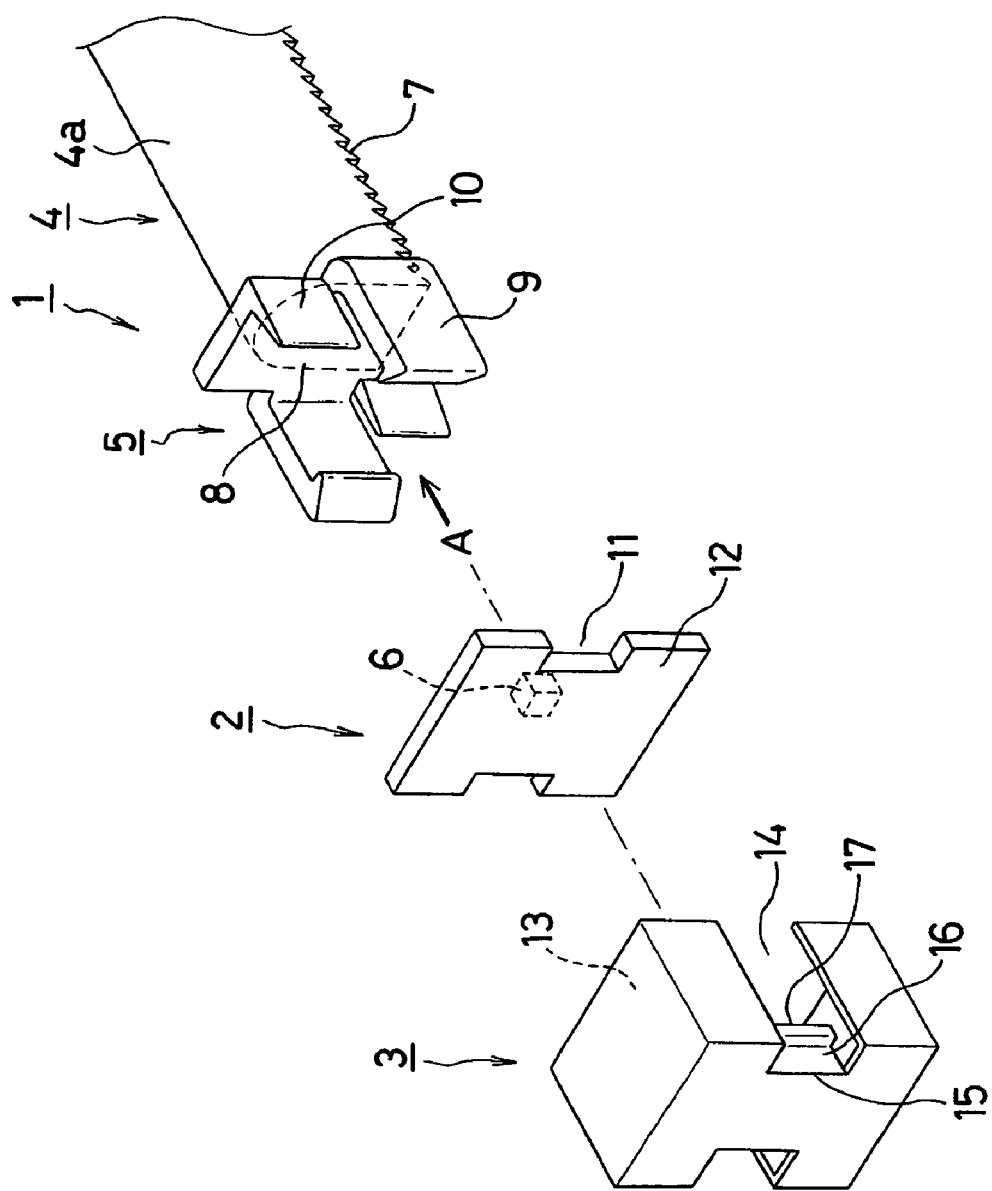
FIG. 1 is an exploded stereograph view showing an embodiment of an illumination device made in accordance with the principles of the invention.
Figure 1:
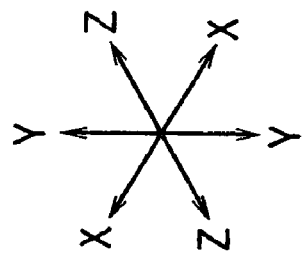

Preferred embodiments of the invention will now be described in detail with reference to FIGS. 1-5 (with the same reference numerals denoting the same or similar parts). The below-described embodiments are specific examples of the invention and are given various technical features. Accordingly, the scope of the invention is not limited to these embodiments.

FIG. 1 is an exploded stereograph showing an embodiment of an illumination device made in accordance with the principles of the invention. This embodiment can include roughly three major components: an optical guide section 1, a light source section 2, and a cover 3.

The following description is first given with respect to the optical guide section 1. The optical guide section 1 can be composed of a transparent material. Preferably, it is colorless and transparent to suppress loss in light guided through the inside of the guide section 1. The optical guide section 1 can include a light guide 4, which can be shaped substantially as a rod having a certain length. The rod can have a cross-sectional shape normal to the longitudinal direction that is defined with three sides formed by almost orthogonal straight lines and a remaining side formed as a curved line.

A light access 5 can be integrally formed with at least one end of the light guide 4 of the optical guide section 1. A diffuser cut 7 can be formed as almost serrate edges or triangular wavy shapes in the side located in the middle of the straight lines that configure the three orthogonally straight sides of the light guide 4. The diffuser cut can have apex lines perpendicular to the direction of the light that is emitted from an LED lamp 6 (later described) and which is introduced into the light guide 4 through the light access 5.

The light access 5 may be formed at only one end of the light guide 4 when the light guide 4 is short in length. In this case, the light emitted from the LED lamp 6 can be introduced into the light guide 4 through only one end of the light guide 4. Accordingly, the diffuser cut 7 can be suitably formed as a serrated edge. The light access 5 may be formed at each of both ends of the light guide 4 when the light guide 4 is long in length. In this case, the light emitted from the LED lamp 6 can be introduced into the light guide 4 through both ends of the light guide 4. Accordingly, the diffuser cut 7 can be suitably formed as a triangular wavy shape.

The side opposite to the side with the diffuser cut 7 formed thereon, or the side formed along the curved line, can be configured to shape the light guide lens 4a in the form of, for example, a circular arc. In this case, the sectional shape of the light guide lens 4a can be maintained along the length of the light guide 4. Thus, the light guide lens 4a can be cylindrically shaped.

The light access 5 that can be integrally formed with at least one end of the light guide 4 can include a pair of engagement hooks 9 formed thereon. The engagement hooks 9 can extend in the opposite direction relative to the light guide 4 from a base 8 that is formed in a plane normal to the longitudinal direction of the light guide 4. The light access can also include a pair of positioning ribs 10 formed thereon, which protrude similarly from the base 8 in the same direction as the engagement hooks 9.

A positional relation of the positioning ribs 10 to the engagement hooks 9 is described below. When the light access 5 is seen from the direction of extension of the engagement hooks 9 or the direction of the protrusion of the positioning ribs 10 (from direction A in FIG. 1), the positioning ribs 10 can be located between the engagement hooks 9 and close to the engagement hooks 9 in the X direction (direction of coupling for the pair of engagement hooks 9). The positioning ribs 10 can be located outside the engagement hooks 9 in the Y direction (direction normal to the direction of coupling for the pair of engagement hooks 9).

In the light source section 2, the LED lamp 6 can be mounted on a printed circuit board 12 that has rectangular recesses 11 formed on opposite ends thereof. The LED lamp 6 can be set to have an optical axis of emission normal to the surface of the printed circuit board 12. Emission of light from the LED lamp 6 occurs after a forward voltage is applied across an anode electrode and a cathode electrode of the LED lamp 6. Therefore, electric wires are provided to connect the anode and cathode electrodes of the LED lamp 6 to a power source, which are not shown in the figure.

The cover 3 can be composed of an opaque material and shaped in a rectangle having a certain thickness. The cover can include one plane formed as a first aperture 13. The cover can also have second apertures 14 each continuously formed in the middle of each of a pair of planes normal to the first aperture 13 and the middle of a plane opposite to the first aperture 13. Angles 16 can be formed at locations in the vicinity of ends 15 of the second apertures 14 in the planes normal to the first aperture 13. The angles 16 can be formed to have almost the same width as that of the second aperture 14 and can rise toward the first aperture 13. The angles 16 can include end surfaces 17 on tips of the angles 16, and the end surfaces 17 can be bent into L-shapes toward the first aperture 13.

The following description is given to a method of assembling the illumination device that includes the optical guide section 1, the light source section 2 and the cover 3 as components. The method is simple because members such as screws and adhesives are not required and time-consuming work such as thread engagement is not necessary for assembly.

Specifically, the printed circuit board 12 with the LED lamp 6 mounted thereon can be first press-fit into the light access 5 that is integrated with the light guide 4 such that the direction of radiation from the LED lamp 6 is pointed toward the light guide 4. In this case, the positioning ribs 10 can be configured to prevent the printed circuit board 12 from press-fitting into contact with the base 8 of the light access 5, thus setting a separation or set-off distance between the LED lamp 6 and the base 8 of the light access 5 (a location in the Z-direction). In addition, the engagement hooks 9 formed in the light access 5 can be fitted within the recesses 11 formed in the printed circuit board 12 to position the LED lamp 6 in the X- and Y-directions.

As the cover 3 is advanced in a similar direction, the printed circuit board 12 can be sandwiched between the tips of the positioning ribs 10 of the light access 5 and the angles 16 of the cover 3. In addition, the printed circuit board 12 can be enclosed by the cover 3 and the engagement hooks 9. Thus, the light emitted from the LED lamp 6 can be substantially or totally prevented from leaking from the illumination device.

Figure 2:
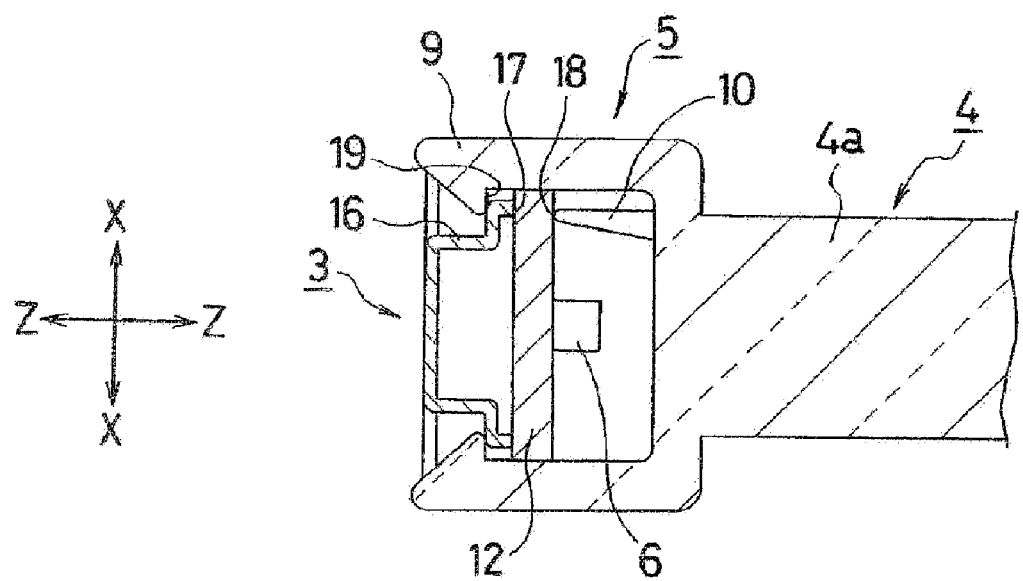
FIG. 2 is a cross-sectional view in the X-Z plane of the embodiment of FIG. 1.

FIG. 2 is a cross-sectional view taken in the X-Z plane of an assembled product of an illumination device made in accordance with the principles of the invention. The printed circuit board 12 with the LED lamp 6 mounted thereon can be sandwiched between the tips 18 of the positioning ribs 10, formed on the light access 5 integrated with the light guide 4, and the end surfaces 17 of the angles 16 formed on the cover 3. The tops of the end surfaces 17 of the angles 16 can be engaged with engagement surfaces 19 of the engagement hooks 9 formed in the light guide 4 to prevent movement or leaping.

Figure 3:
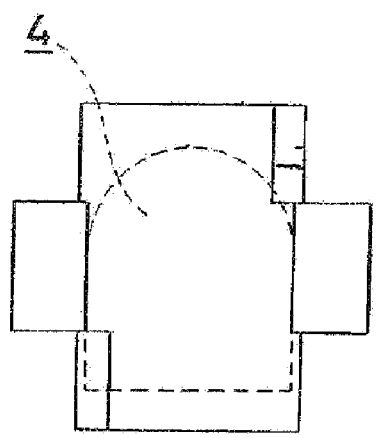
FIG. 3 is a front view seen from direction A of the embodiment of FIG. 1.

FIG. 3 is a front view of the optical guide section 1 seen from direction A as shown in FIG. 1, which shows a positional relation between the light guide 4 and the light access 5.

Figure 4A:
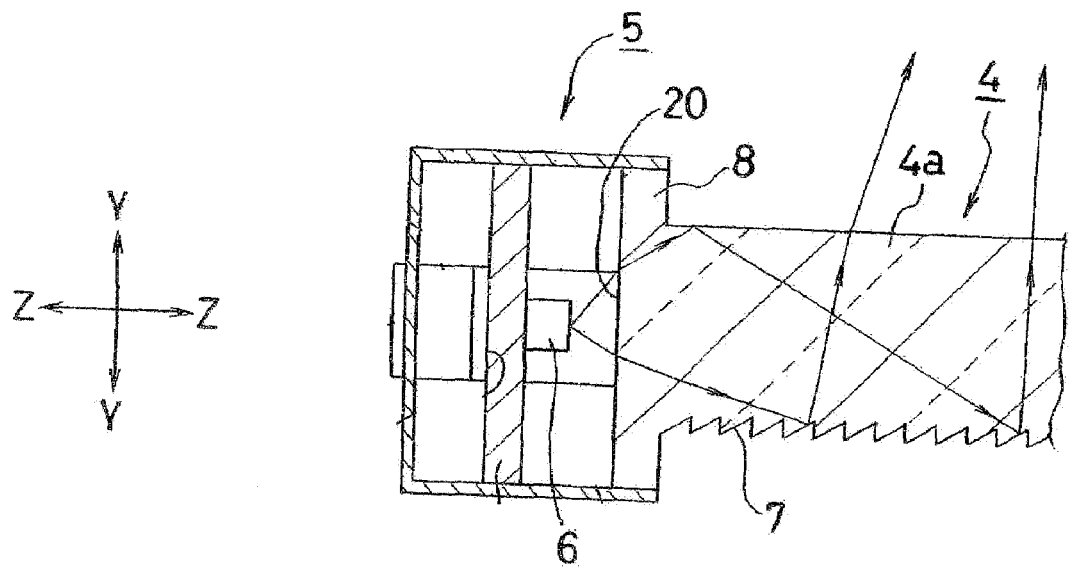
FIG. 4a-b are cross-sectional views in the Y-Z plane of the embodiment of FIG. 1.
Figure 4B:
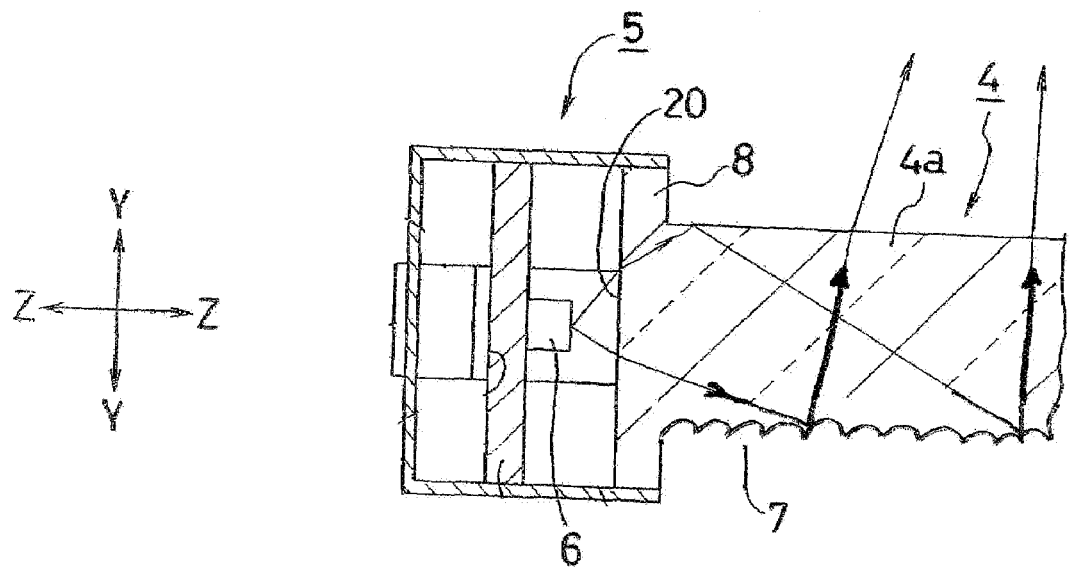

An optical system for the illumination device thus configured is described with reference to FIG. 4a-b, which shows a cross-sectional view taken in the Y-Z plane of an assembled product of an illumination device. When the LED lamp 6 is turned on, the light emitted from the LED lamp 6 can be introduced into the light guide 4 through a light incident surface 20 of the base 8 of the light access 5. The light introduced into the light guide 4 can be partly led to the surface having the serrate diffuser cut 7 (as shown in FIG. 4a) or the triangular wavy diffuser cut 7 (as shown in FIG. 4b), and can be reflected at the diffuser cut 7 toward the light guide lens 4a formed in the opposite surface.

Similarly, the light introduced into the light guide 4 can be partly led to an interface between the light guide 4 and the atmosphere. There is a difference in refractive index between the material of the light guide 4 and the atmosphere. Accordingly, when the light enters at a larger incident angle than the critical angle into the interface of the light guide 4 having a higher refractive index, it is totally reflected from the interface into the light guide 4. With repetition of such total internal reflection, the light travels toward the other end of the light guide 4.

In this case, part of the reflected light may advance toward the surface with the serrate or triangular wavy diffuser cut 7. That light part is then reflected from the diffuser cut 7 toward the light guide lens 4a that is formed on the opposite surface.

Thus, most of the light, which is reflected from the serrate or triangular wavy diffuser cut 7 toward the light guide lens 4a reaches the interface between the light guide 4 and the atmosphere at a smaller angle than the critical angle. Therefore, this light is externally released from the light guide lens 4a, that is, it is emitted to the atmosphere after being refracted in accordance with the determined shape of the light guide lens 4a. In this embodiment, as the shape is cylindrical, the light guide 4 can effectively diffuse the light over the width of the light guide 4 if it is linear in shape.

The shape of the light guide 4 is not limited to a one-dimensional shape, such as a straight line. For example, it may be formed almost annular or in a three-dimensional shape such as a coil spring shape. Thus, illumination patterns can be obtained corresponding to various shapes, in which the light guide lens 4*a* is formed.

Figure 5:
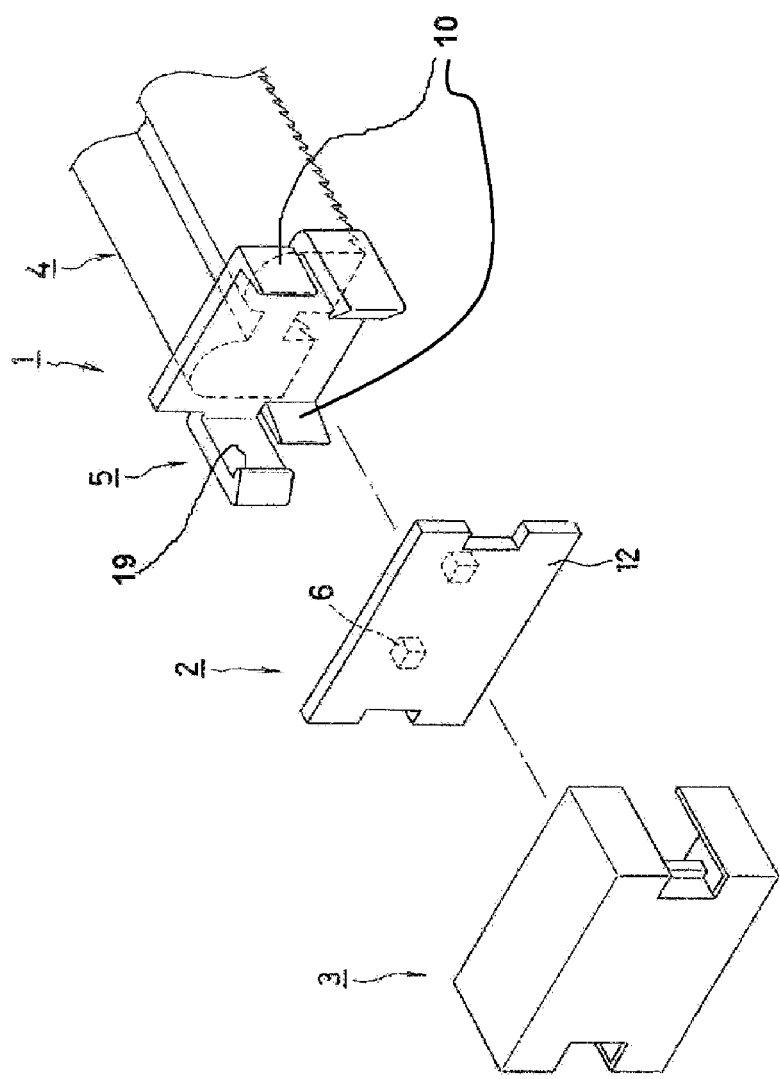
FIG. 5 is an exploded stereograph view showing another embodiment of an illumination device made in accordance with the principles of the invention.
Figure 6:
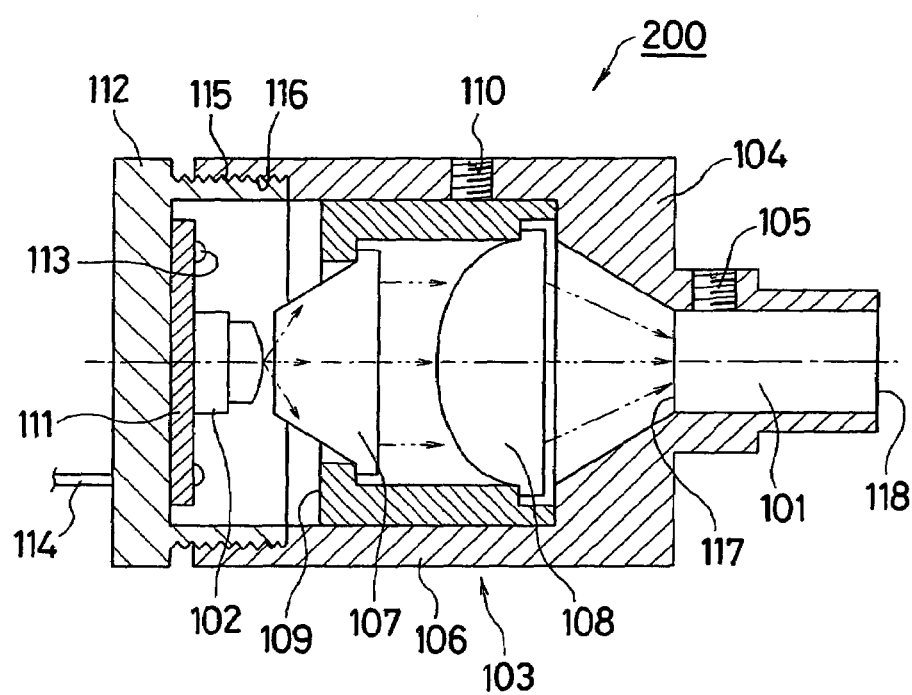
FIG. 6 is a cross-sectional view showing a related art illumination device.

FIG. 5 is an exploded stereograph showing another embodiment of an illumination device made in accordance with the principles of the invention. When a laterally spread illumination pattern is desired, for example, LED lamps 6 may be arranged at both ends of a single light guide 4 to introduce light from the LED lamps 6 through both ends of the light guide 4. Even in such a case, an insufficient amount of light may result.

In the embodiment of FIG. 5, plural (two in the example shown in the figure) optical guide sections 1 with light accesses 5 formed at both ends can be provided in parallel. Lights from LED lamps 6 can be introduced into light guide 4 through both ends of each optical guide section 1 to increase the amount of light and achieve the laterally spread illumination pattern at the same time. The structure and optical system of the illumination device can be substantially or totally the same as those of the above-described embodiment of FIG. 1, and accordingly further detailed description of these features is not included in the following description.

In the above-described embodiments, the cover 3 may not be employed if prevention of leakage of light is not required. In such the case, however, the printed circuit board 12 with the LED lamp(s) 6 mounted thereon can be sandwiched between the tips of the positioning ribs 10 formed on the light access 5 and the engagement surfaces 19 of the engagement hooks 9 formed on the light access 5.

A variety of light sources such as an incandescent lamp and an LED may be available for use as the light source in the preceding embodiments. Among those, particularly in the case of the LED, a single LED lamp containing one or more LED chips having the same emission color may be employed as the light source to achieve a bright illumination of any monochromatic light. Alternatively, a single LED lamp containing a plurality of LED chips having different emission colors may be employed as the light source to achieve illuminations of any different monochromatic lights and illuminations of multicolored lights such as illuminations that result from additive color mixture of different monochromatic lights.

The above embodiments are described based on the premise that the illumination device is employed as a lamp mainly aimed for illumination and display, such as in a vehicular lamp. However, the purpose of the illumination device of the invention is not limited to the above uses. For example, the illumination device is also applicable for use in decorating with a lighting ring for surrounding an operating portion of household electrical appliance such as a television, a microwave oven and a refrigerator. The illumination device can also be used for indicating the state in a game machine. Furthermore, the illumination device has many other different applications and uses.

While there has been described what are at present considered to be preferred embodiments of the invention, it will be understood that various modifications may be made thereto, and it is intended that the appended claims cover all such modifications as fall within the true spirit and scope of the invention.

For example, the specific method or structures for attaching the various structures and components of the illumination device can be different from those described above and fall within the scope of the invention. The light access can include an engagement/spacer portion that connects the light source between the light access and the cover. The engagement/spacer portion can include the pair of hooks and ribs, as shown in the drawings, but can also be formed as any type of spacer structure connected to any of the components to provide the predetermined set-off distance between the light source and the light guide.

For example, a protrusion can be provided in the cover or in the circuit board to set the connection distance between the light source and the light guide. In addition, the engagement hooks can be provided on the cover or the circuit board and the light access can be provided with hook mating structures for connecting the various structures together. Of course, if the circuit board includes the spacer structure or hooks/engagement structure, then the cover may also include some type of connective structure that acts in conjunction with or separate from the spacer/engagement structure of the circuit board.

In addition, the specific shape and orientations of the structures, components and spacing can vary in accordance with particular applications and desires and still fall within the scope and spirit of the invention.

What is claimed is:

1. An illumination device, comprising:
   an optical guide section including
      a light guide extending along a longitudinal axis and including a transparent material, and
      a light access having a pair of engagement portions, and at least one rib located at at least one end of the light guide and extending in a direction opposite to the direction of extension of the light guide; and
   a light source section including
      a printed circuit board having a pair of opposite ends with respective openings located adjacent thereto, and
      at least one light source electrically connected to the printed circuit board,
   wherein the engagement portions of the light access are respectively located in the openings in the printed circuit board to position the printed circuit board in a plane normal to the longitudinal axis of the light guide, and wherein a tip of the rib of the light access and an engagement surface of the engagement portions sandwich the printed circuit board such that the tip of the rib of the light access positions the printed circuit board in a longitudinal direction with respect to the light guide.

2. The illumination device according to claim 1, further comprising:
   a cover including an opaque material and having angles located thereon, wherein the angles and the tip of the rib sandwich the printed circuit board therebetween, and wherein the cover and the engagement portions of the light access cover the printed circuit board to prevent leakage of light.

3. The illumination device according to claim 1, wherein the light guide is formed in a substantial rod shape, the light guide having four side surfaces in section normal to the longitudinal axis of the light guide, one surface includes a light guide lens formed to be almost semicylindrical, and an opposite surface includes a diffuser cut formed as one of substantially serrated and substantially triangular.

4. The illumination device according claim 1, wherein the light source connected to the printed circuit board includes an LED lamp that has at least one of the following: an LED chip having an emission color; a plurality of LED chips having the same emission color; and, a plurality of LED chips having different emission colors.

5. The illumination device according to claim 4, wherein the LED lamp including a plurality of LED chips having different emission colors is capable of emitting one of the following types of light: a monochromatic light; lights of any selected colors; and, lights of all colors.

6. The illumination device according to claim 2, wherein the light guide is formed in a substantial rod shape, the light guide having four side surfaces in section normal to the longitudinal axis of the light guide, one surface includes a light guide lens formed to be substantially semicylindrical, and an opposite surface includes a diffuser cut formed as one of substantially serrated and substantially triangular.

7. The illumination device according claim 2, wherein the light source connected to the printed circuit board includes an LED lamp that has at least one of the following: an LED chip having an emission color; a plurality of LED chips having the same emission color; and, a plurality of LED chips having different emission colors.

8. The illumination device according claim 3, wherein the light source connected to the printed circuit board includes an LED lamp that has at least one of the following: an LED chip having an emission color; a plurality of LED chips having the same emission color; and, a plurality of LED chips having different emission colors.

9. The illumination device according to claim 7, wherein the LED lamp including a plurality of LED chips having different emission colors is capable of emitting one of the following types of light: a monochromatic light; lights of any selected colors; and, lights of all colors.

10. The illumination device according to claim 8, wherein the LED lamp including a plurality of LED chips having different emission colors is capable of emitting one of the following types of light: a monochromatic light; lights of any selected colors; and, lights of all colors.

11. The illumination device according to claim 1, wherein the light guide is composed of a transparent material.

12. The illumination device according to claim 1, wherein the engagement portions are formed as hooks.

13. The illumination device according to claim 1, wherein the at least one rib includes a pair of ribs.

14. The illumination device according to claim 1, wherein the engagement portions and the rib are integrally formed with the light guide.

15. The illumination device according to claim 1, wherein the openings are formed as recesses in the circuit board.

16. The illumination device according to claim 1, wherein the light source is mounted on the circuit board.

17. The illumination device according to claim 1, wherein a tip of the rib impinges against the circuit board to position the circuit board at a predetermined longitudinal location with respect to the light guide.

18. An illumination device, comprising:
  a light guide configured as a solid rod having a longitudinal axis;
  a light access integrally formed with an end of the light guide and including an engagement/spacer portion formed therein;
  a cover connected to the engagement/spacer portion; and
  a light source located between the light access and cover and spaced from the light guide by a spacer structure.

19. The illumination device according to claim 18, wherein the spacer structure includes a rib that is integrally formed in the engagement/spacer portion of the light access.

20. The illumination device according to claim 18, wherein the engagement/spacer portion includes a pair of hooks that connect to opposite sides of the cover.

21. The illumination device according to claim 18, wherein the light source has an optical axis that extends though the solid rod of the light guide and substantially parallel or coincident with the longitudinal axis of the light guide, and the solid rod is longer along the longitudinal axis than in any direction normal to the longitudinal axis.

* * * * *